3,076,742
CLATHRATE COMPOUND OF METHYL BROMIDE
Burl E. Bryant, Lake Jackson, Tex., assignor to The Dow Chemical Company, Midland, Mich., a corporation of Delaware
No Drawing. Filed May 4, 1959, Ser. No. 810,568
5 Claims. (Cl. 167—39)

This invention relates to a new composition of matter and its use in agriculture. More particularly, it is concerned with a solid clathrate compound of methyl bromide and hydroquinone and its use as a fumigant.

Methyl bromide is a highly toxic, highly irritating gas which has found considerable use in agriculture as an agent for the control of rodents and as soil fumigant particularly for the control of nematodes and weed seeds. Because the material is a gas, there are certain handling, distribution and application hazards and difficulties which restrict the use of methyl bromide. Thus, at present soil fumigation with methyl bromide requires marketing in and application from pressurized steel containers which requires special devices for safely releasing the fumigant. This has seriously curtailed the use of methyl bromide as soil fumigant particularly by farmers carrying out relatively small scale operations, by non-professional people and by home gardeners.

It is an object of the present invention to provide new chemical compositions. A further object is to provide a new method for fumigation. A still further object is to provide for a new method of treating soil. Another object is to provide a method for the control of soil parasites and undesired weeds, plants and weed seeds. An additional object is the provision of novel compositions to be employed in the new method for treating soil. Other objects will become apparent from the following specification and claims.

According to this invention, it has been found that when hydroquinone in the solid phase is brought into contact with liquid methyl bromide, a methyl-bromide-hydroquinone clathrate compound is formed which has certain useful and valuable properties. The clathrate compound of this invention is a finely divided gray-white solid which has essentially no vapor pressure of the toxic methyl bromide. In the presence of moisture such as is present in natural soil, methyl bromide is relatively slowly and uniformly released as a gas. In addition to water, the clathrate compound is readily soluble insolvents such as acetone, ethanol and ether and releases the methyl bromide when dissolved. The solid compound melts at about 175° C. with release of all the methyl bromide. It has been found that the hydroquinone-methyl bromide clathrate compounds of the present invention may be prepared containing up to 22.6 percent by weight of methyl bromide. For most uses of the clathrate compound, it is desirable that the methyl bromide content in the clathrate be at least 2 percent.

The new clathrate compound is formed by bringing the hydroquinone and liquid methyl bromide into contact with one another under conditions conducive to the formation of the crystalline complex. This may be carried out very readily and simply by contacting crystalline hydroquinone with methyl bromide in a closed container in the temperature range of from about 20° C. to 80° C. The exact amounts of the components are not critical, however, the methyl bromide should be employed in excess and two to eight parts by weight of methyl bromide per one part by weight of hydroquinone is considered preferable. The clathrate formation commences almost immediately and is completed in from about 4 to 16 hours.

In a representative operation, hydroquinone is placed in a container and the container cooled to a temperature substantially below the boiling point of methyl bromide preferably 0° to —30° C. Excess methyl bromide is added thereto and the container sealed. The vessel containing the components is warmed to a temperature in the range of from about 20° to 80° C. whereupon the hydroquinone gradually dissolves in the methyl bromide and a reaction takes place with the formation of the methyl bromide-hydroquinone clathrate complex which precipitates in the reaction mixture as a crystalline white solid. After completion of clathrate complex formation, the vessel is cooled to the liquefaction temperature of methyl bromide and opened. The contents are then allowed to warm to room temperature to vaporize excess methyl bromide leaving solid methyl bromide-hydroquinone clathrate compound.

The methyl bromide-hydroquinone clathrate of the present invention has numerous utilities. Certain of these utilities are dependent solely on the formation of clathrate while certain other utilities comprise an improved use for the known uses of methyl bromide.

Illustrative of the utilities dependent on clathrate formation, per se, is the use of clathrate formation to separate methyl bromide from other mono- and polyhalogen compounds such as those derived from 2-methylpropane or 2-methylbutane or those having nitro, carboxy, hydroxy, amino or other substituents, as well as from more highly halogenated hydrocarbons such as tetrabromoethane or carbon tetrabromide. These mixtures of hydrocarbons are frequently found in many processes involving the synthesis or use of halogenated hydrocarbons and frequently requiring separation. In many cases where conventional procedures such as distillation is impractical, the adducts of the present invention provide a practical means for the separation of methyl bromide from the other halogen compounds.

The methyl bromide-hydroquinone clathrate product may be employed in substantially all the agricultural applications of methyl bromide and is particularly convenient for applications on a small scale or by non-professional growers. Thus, as a soil fumigant for the control of soil nematodes and other soil parasites, or weed seeds, the product is merely intimately admixed with soil. The composition may be handled as a dry powder or in pellet form requiring no specialized equipment. The clathrate complex may be employed in inert solid carriers if its dilution or extention is helpful in application against any pest. Suitable solid carriers include talc, chalk, gypsum, vermiculite, bentonite, fuller's earth, attapulgite and other clays, solid detergents and sand. Compositions of the clathrate in inert carriers may contain from 0.001 percent to greater than 95 percent by weight of the clathrate compound. Preferred compositions are the clathrate in sand, attaclay granules and gypsum (chalk) granules. Such compositions generally contain from 5 to 75 percent by weight of the clathrate compound. The clathrate product with or without a powder carrier may be applied as a dust to the dry surface of the soil of land which has been prepared for planting and then immediately plowed in; or the clathrate product or a mixture thereof with inert powder carrier with or without sand may be applied in soil such as in furrows to a depth of four or five inches on 12 inch centers and thereafter covered with soil. In application by non-agriculturists, such as home gardeners, the clathrate compound may be spread on the dry surface of the soil and tilled in, or furrows may be made in the garden plot and the clathrate with or without carrier applied at the bottom of the furrow and then covered with soil. Application in furrows is considered the preferred method.

In application of soil the clathrate compound may be applied in an amount sufficient to supply 50 to 500 pounds of methyl bromide per acre at a depth of from 5 to 10 inches. In its use as a soil fumigant for the control of nematodes, fungi and other parasites, it is preferred that the clathrate product be administered to soil when the soil has a temperature of 60° F. to 90° F. and a moisture content of from about 5 to 15 percent at a dosage sufficient to supply 100 to 250 pounds of methyl bromide per acre. When the control of nut grass, other weeds and weed seeds are to be included, a higher dosage level, about 400 to 450 pounds of methyl bromide per acre is preferred. The exact amount of the methyl bromide-hydroquinone clathrate compound to be employed for a particular dosage depends on the content of the methyl bromide in the methyl bromide-hydroquinone clathrate compound and may readily be determined therefrom.

In a further modification of the procedure, the treated soil area may be covered with plastic sheet or tarpaulin for from two to five days to maintain an atmosphere of the released methyl bromide gas. This modified procedure is particularly desirable for weed seed control.

By the procedures outlined above, the control of undesirable plants, weeds, seeds, fungi and insects susceptible to methyl bromide is obtained. Such treatment is usually sufficient to provide weed and nematode control to last for several seasons or until such time that the area is reinfested by birds, wind, other natural vectors or transfer of infested soil from untreated areas.

The following examples illustrate the present invention but are not to be construed as limiting.

*Example 1*

50 grams (0.455 mole) of hydroquinone was placed in a heavy-walled glass tube and the tube immersed in an acetone-Dry Ice bath (temperature about −78° C.) 100 grams (1.06 moles) of methyl bromide was added thereto and liquified therein. The tube containing the hydroquinone and methyl bromide was then sealed and heated to about 60° C. to dissolve a portion of the hydroquinone. The mixture was maintained at about 60° C. and autogenous pressure for 16 hours during which time the crystals of hydroquinone dissolved and the methyl bromide-hydroquinone clathrate compound precipitated therein. At the end of this period, the tube was cooled in an acetone-Dry Ice bath and opened. The contents were then allowed to warm to room temperature during which time the excess methyl bromide volatilized and the methyl bromide-hydroquinone clathrate compound recovered as a white solid residue. The solid remaining weighed about 61 grams and had a methyl bromide content of 17.7 percent by weight.

*Example 2*

In a manner similar to that described in Example 1, a methyl bromide-hydroquinone clathrate compound having a 14 percent methyl bromide content is prepared from methyl bromide and hydroquinone. The density of the methyl bromide-hydroquinone clathrate compound containing 14 percent methyl bromide is 1.409.

*Example 3*

0.185 gram of the methyl bromide-hydroquinone clathrate compound having a methyl bromide content of 17.7 percent was intimately admixed into 300 grams of nematode-infested soil having a moisture content of about 10 to 15 percent. This corresponds to a dosage of 220 pounds per acre furrow slice. The treated mixture was then placed in a closed container and allowed to stand for three days in a greenhouse having a day temperature of 80°–85° F. and a night temperature of about 75° F. As a check operation, 300 grams of untreated nematode-infested soil was also placed in a closed container and allowed to stand for three days at the same temperature. At the end of this period, the containers were opened, the soil thoroughly mixed, and the soil taken and treated by "The Funnel Method After Baermann" to separate live nematodes. This method is described in "A Manual of Agricultural Helminthology," by I. N. Filipjev and J. H. Schuurmans (1941), page 181. In such a method, the nose of a funnel is provided with a short rubber tube and a clamp. The soil aliquot is placed on a piece of soft absorbent paper in the opening of the funnel which has been nearly filled with water. The live nematodes wriggle out of the soil samples and into the water in the rubber tube on the nose of the funnel where they are retained. Twenty-four hours following the initiation of the Baermann treatment, the fluid in the rubber tube was examined microscopically and counts of nematodes made. The results obtained were as follows:

| Soil: | Number of live active nematodes |
|---|---|
| Treated | 2 (one nearly dead). |
| Untreated check | 910. |

*Example 4*

In a similar operation as that described in Example 2, other samples of soil were treated and compared with untreated controls to determine the number of live nematodes. The following results were obtained:

| Soil: | Number of live active nematodes |
|---|---|
| Treated | 0 |
| Untreated check | 1170 |

*Example 5*

A field of silty loam soil heavily infested with nematodes having a soil moisture of 11.58 percent at the time of treatment and a soil temperature of about 90° F. was tilled to a depth of 6 inches. Thereafter, the field was bedded into rows and each bed furrowed.

The solid methyl bromide-hydroquinone clathrate compound at dosage rates based on methyl bromide at 220 pounds per acre and 440 pounds per acre, broadcast basis, was sifted into the bottom of the furrows, care being taken to insure uniformity of application with respect to furrow length. Since the 440-pound rate had sufficient bulk for easy distribution, it was applied undiluted. The 220-pound rate, however, was extended by mixing with an equal volume of oven-dried sand, to permit uniform distribution. The furrows were then immediately covered with the excavated soil and the beds were rolled to pack the surface soil and to press the fumigant to a final depth of 5 inches. Half of the plots were covered with plastic film and the remainder left uncovered. Nematode counts were then made at 24 hours and 5 days after application by taking samples of 300 grams from a position (1) 6 inches to one side of the line of application and (2) 10 inches to one side of the line of application. The results were as follows:

| Treatment | Dosage in lbs., methyl bromide/acre | Number of nematodes, all species | | |
|---|---|---|---|---|
| | | 24 hours | 5 days | |
| | | 6 inch distant | 6 inch distant | 10 inch distant |
| Methyl bromide-hydroquinone. | 220, open | 0 | 0 | 220 |
| Do | 220, covered | 0 | 0 | 0 |
| Do | 440, open | 3 | 1 | 41 |
| Do | 440, covered | 3 | 0 | 1 |

As a check to the above operations, random 300 gram samples of the soil were taken from adjoining untreated plots and nematode counts made in the same manner. It was found that in three checks taken after 24 hours, the samples contained 1200, 1020 and 1270 nematodes; and in two checks taken after 5 days, the samples contained 2170 and 1920 nematodes.

Example 6

A garden plot, 100 feet by 100 feet, and heavily infested with nut grass (*Cyperus rotundus*), other weeds, weed seeds and nematodes is tilled with a roto-tiller to thoroughly loosen the soil in the beds. 736 pounds of a methyl bromide-hydroquinone clathrate compound having a methyl-bromide content of 12.5 percent is applied to the dry surface by means of a fertilizer distributor. The above amount of the methyl bromide-hydroquinone clathrate compound is sufficient to supply methyl bromide at a dosage of 400 pounds per acre. Immediately after the application, the soil is turned in and the surface rolled. The freshly rolled soil is covered with a plastic film and the edges sealed with moist soil.

Five days after treatment, the plastic film is removed. It is found that the treated soil is free from nut grass, other weeds, weed seeds and nematodes.

Example 7

A garden plot 50 feet by 50 feet, of sandy loam soil and infested with weeds, fungi and nematodes is treated with 184 pounds of a methyl bromide-hydroquinone clathrate compound having a methyl bromide content of 12.5 percent. The application is carried out with a fertilizer distributor on the dry surface and the amount is sufficient to supply methyl bromide at a dosage of 400 pounds per acre. Immediately after the application, the ground is tilled and the surface thereafter rolled.

Three days after treatment, the soil in the plot is examined and it is found that the treated soil is free of weeds, fungi and nematodes.

I claim:

1. A solid clathrate compound of methyl bromide and hydroquinone.
2. A process for producing a solid clathrate compound of methyl bromide and hydroquinone comprising contacting solid hydroquinone with an excess of methyl bromide in a closed vessel in the temperature range of from about 20° to 80° C., to form a solid complex thereof, separating the solid complex from excess methyl bromide by vaporizing the latter and recovering the clathrate compound as residue.
3. A composition of matter comprising a solid clathrate compound of methyl bromide-hydroquinone in an inert solid carrier wherein said composition contains from about 0.001 to about 95 percent by weight of the clathrate compound.
4. A method for fumigating soil comprising dispersing through soil a solid clathrate compound of methyl bromide and hydroquinone.
5. A method for treating soil to control nematodes which comprises introducing into soil a solid clathrate compound of methyl bromide and hydroquinone.

References Cited in the file of this patent

UNITED STATES PATENTS

| | | |
|---|---|---|
| 1,908,817 | Britton et al. | May 16, 1933 |
| 2,381,209 | Cotton | Aug. 7, 1945 |
| 2,751,713 | Abramitis | June 26, 1956 |
| 2,798,891 | Schaeffer | July 9, 1957 |
| 2,820,071 | Ceaglske | Jan. 14, 1958 |
| 2,912,793 | Stone et al. | Nov. 17, 1959 |
| 2,938,022 | Clark | May 24, 1960 |

OTHER REFERENCES

Swanson et al.: Chem. Abstracts, vol. 37 (1943), 1 page.

Andrews et al.: Chem. Abstracts, vol. 37 (1943), 1 page.

Powell: Jour. Chem. Soc. London (1948), pages 61–73 (pp. 65–66 only relied on).

Powell: Jour. Chem. Soc. London (1948), pages 815–21.